(12) United States Patent
Ichikawa

(10) Patent No.: US 9,197,100 B2
(45) Date of Patent: Nov. 24, 2015

(54) VEHICLE AND COMMUNICATION DEVICE FOR VEHICLE

(75) Inventor: Shinji Ichikawa, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 705 days.

(21) Appl. No.: 13/519,464

(22) PCT Filed: Dec. 28, 2009

(86) PCT No.: PCT/JP2009/071746
§ 371 (c)(1),
(2), (4) Date: Jun. 27, 2012

(87) PCT Pub. No.: WO2011/080816
PCT Pub. Date: Jul. 7, 2011

(65) Prior Publication Data
US 2012/0288016 A1 Nov. 15, 2012

(51) Int. Cl.
*H02J 7/00* (2006.01)
*H02J 7/14* (2006.01)
(Continued)

(52) U.S. Cl.
CPC ............ *H02J 13/002* (2013.01); *B60L 7/14* (2013.01); *B60L 11/005* (2013.01); *B60L 11/123* (2013.01); *B60L 11/14* (2013.01); *B60L 11/1816* (2013.01); *B60L 11/1824* (2013.01); *B60L 11/1838* (2013.01); *B60L 11/1846* (2013.01); *B60L 11/1898* (2013.01); *H04B 3/546* (2013.01); *B60L 2210/14* (2013.01); *B60L 2210/30* (2013.01); *B60L 2210/40* (2013.01); *B60L 2220/14* (2013.01); *B60L 2230/12* (2013.01); *B60L 2270/147* (2013.01); *H02J 7/022* (2013.01); *H04B 2203/5441* (2013.01); *H04B 2203/5491* (2013.01); *Y02B 90/2692* (2013.01); *Y02T 10/6217* (2013.01); *Y02T 10/7022* (2013.01); *Y02T 10/7077* (2013.01); *Y02T 10/7088* (2013.01); *Y02T 10/7225* (2013.01);
(Continued)

(58) Field of Classification Search
USPC .......... 375/257; 320/108, 109, 137, 107, 111, 320/138, 165; 180/65.29, 65.1, 65.21, 180/65.265
See application file for complete search history.

(56) References Cited

U.S. PATENT DOCUMENTS

| | | | |
|---|---|---|---|
| 5,477,216 A * | 12/1995 | Lee et al. ................. | 340/870.02 |
| 2007/0136766 A1* | 6/2007 | Iwamura .......................... | 725/79 |
| 2009/0287578 A1* | 11/2009 | Paluszek et al. ................ | 705/17 |
| 2010/0007306 A1* | 1/2010 | Fukui et al. .................... | 320/107 |
| 2010/0127665 A1* | 5/2010 | Mitsutani ....................... | 320/137 |
| 2011/0000726 A1* | 1/2011 | Tanaka ..................... | 180/65.265 |
| 2011/0127956 A1* | 6/2011 | Mitsutani ...................... | 320/109 |
| 2011/0204849 A1* | 8/2011 | Mukai et al. .................. | 320/111 |

FOREIGN PATENT DOCUMENTS

| | | | |
|---|---|---|---|
| JP | 7-105480 A | 4/1995 | |
| JP | 7-240705 A | 9/1995 | |

(Continued)

OTHER PUBLICATIONS

International Search Report mailed Mar. 23, 2010 of PCT/JP2009/071746.

*Primary Examiner* — Edward Tso
*Assistant Examiner* — Alexis A Boateng
(74) *Attorney, Agent, or Firm* — Kenyon & Kenyon LLP

(57) ABSTRACT

A PLC processing device includes: a filter; a first signal line; a second signal line; and a PLC-ECU. The filter removes noise from a signal transmitted using a power line. The filter is provided on the first signal line. In contrast, the second signal line bypasses the filter. The PLC-ECU communicates using a signal which has passed through the filter while the power storage device is being charged. The PLC-ECU communicates using a signal which has bypassed filter while the charging of the power storage device is stopped.

4 Claims, 4 Drawing Sheets

(51) Int. Cl.
*H02J 13/00* (2006.01)
*B60L 11/18* (2006.01)
*H04B 3/54* (2006.01)
*B60L 7/14* (2006.01)
*B60L 11/14* (2006.01)
*B60L 11/00* (2006.01)
*B60L 11/12* (2006.01)
*H02J 7/02* (2006.01)

(52) U.S. Cl.
CPC ............ *Y02T10/7241* (2013.01); *Y02T 90/121* (2013.01); *Y02T 90/127* (2013.01); *Y02T 90/128* (2013.01); *Y02T 90/14* (2013.01); *Y02T 90/16* (2013.01); *Y02T 90/163* (2013.01); *Y02T 90/168* (2013.01); *Y02T 90/169* (2013.01); *Y02T 90/34* (2013.01); *Y04S 30/12* (2013.01); *Y04S 30/14* (2013.01); *Y04S 40/146* (2013.01)

(56) References Cited

FOREIGN PATENT DOCUMENTS

| | | | |
|---|---|---|---|
| JP | 2002-290288 | A | 10/2002 |
| JP | 2007-236173 | A | 9/2007 |
| JP | 2008-017102 | A | 1/2008 |
| JP | 2008-148062 | A | 6/2008 |
| JP | 2008148062 | A * | 6/2008 |
| JP | 2008-263565 | A | 10/2008 |
| JP | 2008-308030 | A | 12/2008 |
| JP | 2009-165301 | A | 7/2009 |
| JP | 2009-171642 | A | 7/2009 |

* cited by examiner

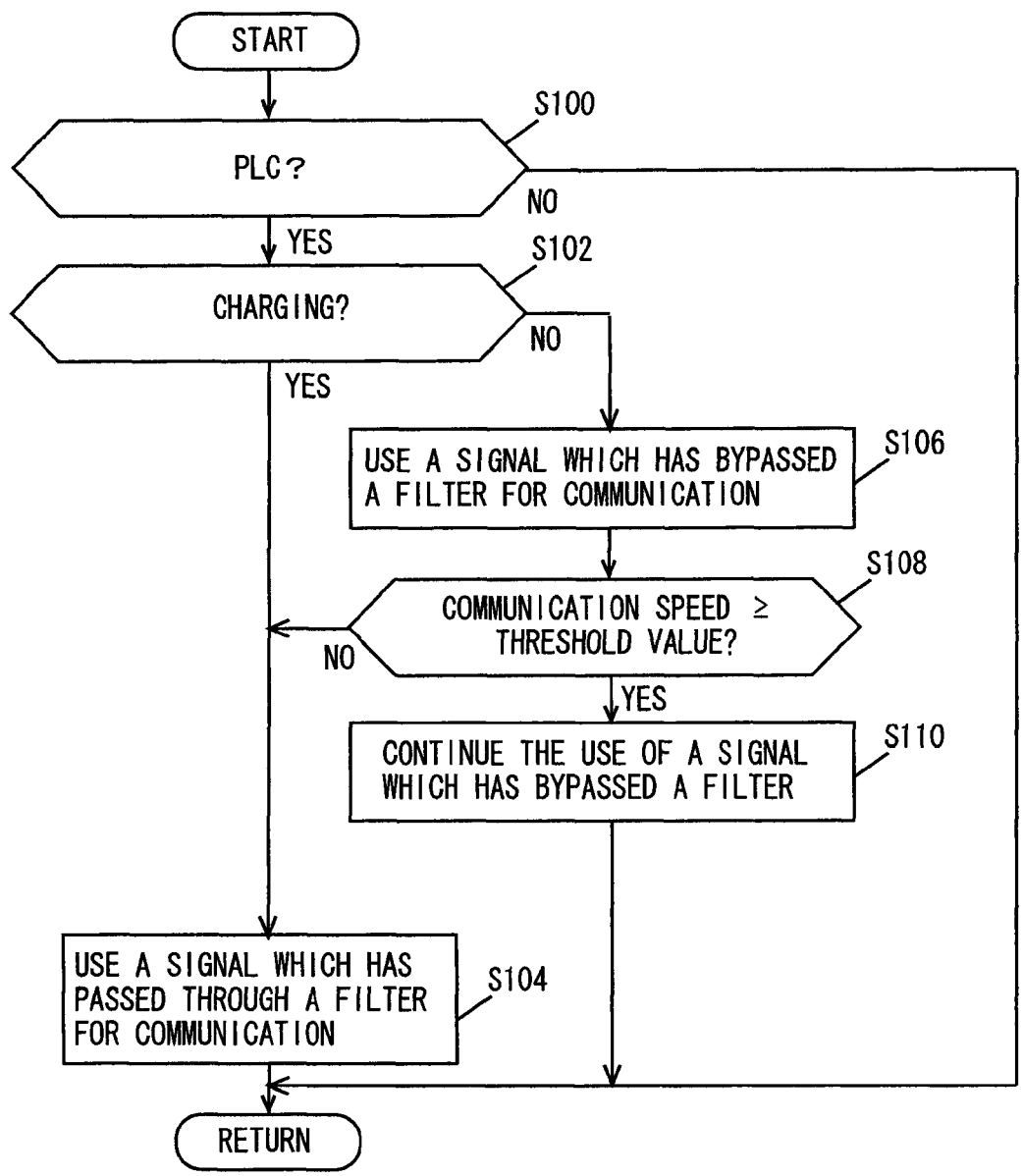

VEHICLE AND COMMUNICATION DEVICE FOR VEHICLE

This is a 371 national phase application of PCT/JP2009/071746 filed 28 Dec. 2009, the contents of which are incorporated herein by reference.

TECHNICAL FIELD

The present invention relates to a vehicle and a communication device for a vehicle, and particularly to a technology to communicate using a power line as a communication path.

BACKGROUND ART

Vehicles incorporating electric motors as their driving sources are known, such as hybrid vehicles, electric vehicles, and fuel cell vehicles. Each of such vehicles is provided with a battery for storing electric power to be supplied to the electric motor. Some of the vehicles are configured to be capable of charging the battery with electric power supplied from a power supply external to the vehicle. Hereinafter, a vehicle capable of charging the battery with electric power supplied from a power supply external to the vehicle is also referred to as a plug-in vehicle. Electric power is supplied to a battery mounted on a plug-in vehicle via a charging cable connected to the plug-in vehicle, a power line disposed in the plug-in vehicle, and the like.

A well known technology relating to PLC (Power Line Communication) makes it possible to utilize a charging cable and a power line as a communication path. Generally, PLC is capable of sending and receiving data faster than wireless communication. Therefore, a fast transmission of data for use in, for example, a car navigation system for a plug-in vehicle can be achieved by PLC utilizing a charging cable and a power line, instead of wireless communication utilizing a cell phone or the like.

A variety of equipment such as an inverter serving as a charger, for example, is connected to a power line, and therefore, noise could superimpose on a power line. Thus, to enhance the communication quality of PLC, some communication apparatuses using PLC are provided with the function of filtering as described in paragraph 72 of Japanese Patent Laying-Open No. 2007-236173 (PTL 1).

CITATION LIST

Patent Literature

PTL 1: Japanese Patent Laying-Open No. 2007-236173

SUMMARY OF INVENTION

Technical Problem

However, a filter provided on a power line to remove noise could cause power loss at the filter to occur.

The present invention has been made in view of the problem above. An object of the invention is to secure the speed of communication and to reduce power loss due to a filter.

Solution to Problem

A vehicle includes: a power storage device charged with electric power supplied from a power supply external to the vehicle; and a communication device to communicate with a device external to the vehicle by utilizing, as a communication path, a power line to supply electric power from the power supply to the power storage device. The communication device includes: a first signal line provided with a filter for removing noise from a signal transmitted using the power line; and a second signal line bypassing the filter. The communication device communicates using: a signal which has passed through the filter while the power storage device is being charged; and a signal which has bypassed the filter while the charging of the power storage device is stopped.

A communication device for a vehicle that is configured to charge electric power supplied from an external power supply into a power storage device and to communicate with an external device by utilizing, as a communication path, a power line for supplying electric power from the power supply to the power storage device. The communication device includes: a first signal line provided with a filter for removing noise from a signal transmitted using the power line; a second signal line bypassing the filter; and a communication control unit for communicating using: a signal which has passed through the filter while the power storage device is being charged; and a signal which has bypassed the filter while the charging of the power storage device is stopped.

Advantageous Effects of Invention

The filter for removing noise is provided on the signal line which is distinct from the power line. An occurrence of power loss due to the filter can thereby be avoided. The communication device communicates using the power line as a communication path. Noise could superimpose on the power line while the power storage device is being charged. Thus, while the power storage device is being charged, the communication device communicates using a signal which has passed through the filter. Communication using a signal from which noise is removed can thereby be realized. In contrast, there is little noise while the charging of the power storage device is stopped. Thus, while the charging of the power storage device is stopped, the communication device communicates using a signal which has bypassed the filter. A decrease in communication speed due to the filter can thereby be prevented while the charging of the power storage device is stopped. Thus, it is possible to secure the speed of communication and to reduce loss due to the filter.

BRIEF DESCRIPTION OF DRAWINGS

FIG. 4 is a flowchart showing a process executed by the PLC processing device shown in FIG. 1.

DESCRIPTION OF EMBODIMENTS

Figure 1:
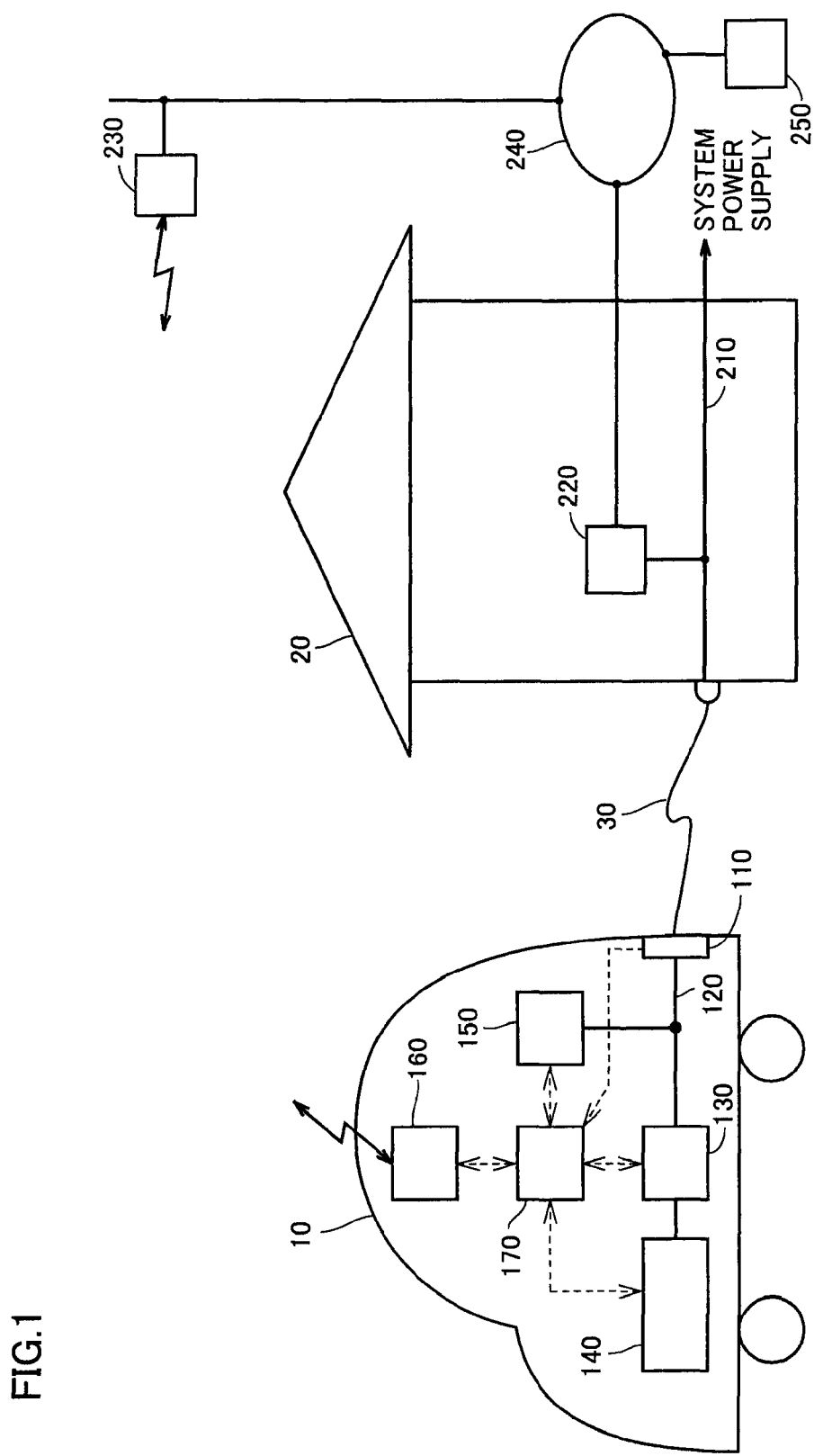
FIG. 1 is a diagram showing an overall configuration of a charging system.

An embodiment will be hereinafter described in detail with reference to the drawings. It is noted that in the drawings, the same or corresponding portions have the same reference signs allotted, and a description thereof will not be repeated.

Referring to FIG. 1, a power storage device mounted on a vehicle 10 can be charged with a commercial power supply (for example, system power supply) by connecting a charging cable 30 between vehicle 10 and a power supply receptacle of a house 20. It is noted that charging vehicle 10 by a power supply external to the vehicle (for example, a system power supply) is hereinafter referred to also as "external charging".

Vehicle 10 includes a charging port 110, a power line 120, a charger 130, a motive power output device 140, a PLC processing device 150, a wireless communication device 160, and a communication control device 170.

Charging port 110 is configured such that charging cable 30 can be connected thereto. It is noted that when charging cable 30 is connected to charging port 110, communication control device 170 is notified of this fact. For example, a connector signal CNCT which is sent out when charging cable 30 is connected to charging port 110, is used to notify communication control device 170 of the fact that charging cable 30 is connected to charging port 110.

Charger 130 is connected to charging port 110 by power line 120 for supplying electric power from a power supply external to vehicle 10 to the power storage device. Charger 130 converts electric power inputted from charging port 110 into a predetermined charging voltage and outputs it to a power storage device included in motive power output device 140. Charger 130 also exchanges various predetermined data with communication control device 170 during external charging.

Motive power output device 140 outputs travel driving force for vehicle 10. Motive power output device 140 includes a power storage device. The power storage device is charged by charger 130 during external charging. Further, motive power output device 140 exchanges various predetermined data with communication control device 170 during the traveling of the vehicle and during external charging.

PLC processing device 150 is connected to power line 120. During external charging, PLC processing device 150 can perform PLC-based communication with a PLC processing device 220 provided at house 20, by utilizing, as a communication path, power line 120, charging port 110, and charging cable 30. PLC processing device 150 is configured of a modem, for example. During external charging, PLC processing device 150 receives, from power line 120, data of a high-frequency signal transmitted from PLC processing device 220 of house 20 and demodulates the received data, and modulates data to be sent to PLC processing device 220 of house 20 and outputs the modulated data to power line 120. It is noted that AC power supplied from a system power supply via charging cable 30 to vehicle 10 has a frequency of, for example, 50 Hz or 60 Hz in Japan, whereas a high frequency signal communicated via charging cable 30 and power line 120 during PLC-based communication has a frequency of, for example, between several MHz to several tens of MHz. A further description of PLC processing device 150 will be given later in detail.

Wireless communication device 160 is configured such that it can communicate with a wireless communication device (base station) 230 put in place by, for example, a cell-phone carrier. For wireless communication, any wireless communication standard is used. In the present embodiment, the maximum speed of communication by wireless communication device 160 is lower than the maximum speed of communication by PLC processing device 150.

Communication control device 170 controls communication by wireless communication device 160 and communication by PLC processing device 150. For example, when charging cable 30 is connected to charging port 110, communication control device 170 exerts control such that PLC processing device 150 performs communication. When no charging cable 30 is connected to charging port 110, communication control device 170 exerts control such that wireless communication device 160 performs communication. It is noted that how communication is controlled is not limited to these manners.

House 20 includes a power line 210 and PLC processing device 220. Power line 210 is connected to the system power supply. In addition, charging cable 30 is connected to the power supply receptacle of power line 210 during the external charging of vehicle 10.

PLC processing device 220 is connected to power line 210. PLC processing device 220 can perform PLC-based communication with PLC processing device 150 of vehicle 10 by utilizing power line 210, charging cable 30, and charging port 110 of vehicle 10 as a communication path during the external charging of vehicle 10. PLC processing device 220 is also configured of, for example, a modem as with PLC processing device 150 of vehicle 10. During external charging, PLC processing device 220 receives, from power line 210, data of a high-frequency signal transmitted from PLC processing device 150 of vehicle 10 and demodulates the received data, and modulates data to be transmitted to PLC processing device 150 of vehicle 10 and outputs the modulated data to power line 210. Wireless communication device 230 is capable of wirelessly communicating with, for example, wireless communication device 160 mounted on vehicle 10.

Wireless communication device 230 and PLC processing device 220 are connected to a data communication network 240 such as the Internet. Wireless communication device 230 and PLC processing device 220 communicate via data communication network 240 such as the Internet with a server 250 operated and managed by, for example, an automobile manufacturer. In the embodiment, for example, data for updating a map used in a car navigation system provided in vehicle 10 is sent from server 250. It is noted that the transmitted data is not limited to the above. Data may be sent from vehicle 10 to server 250.

Figure 2:
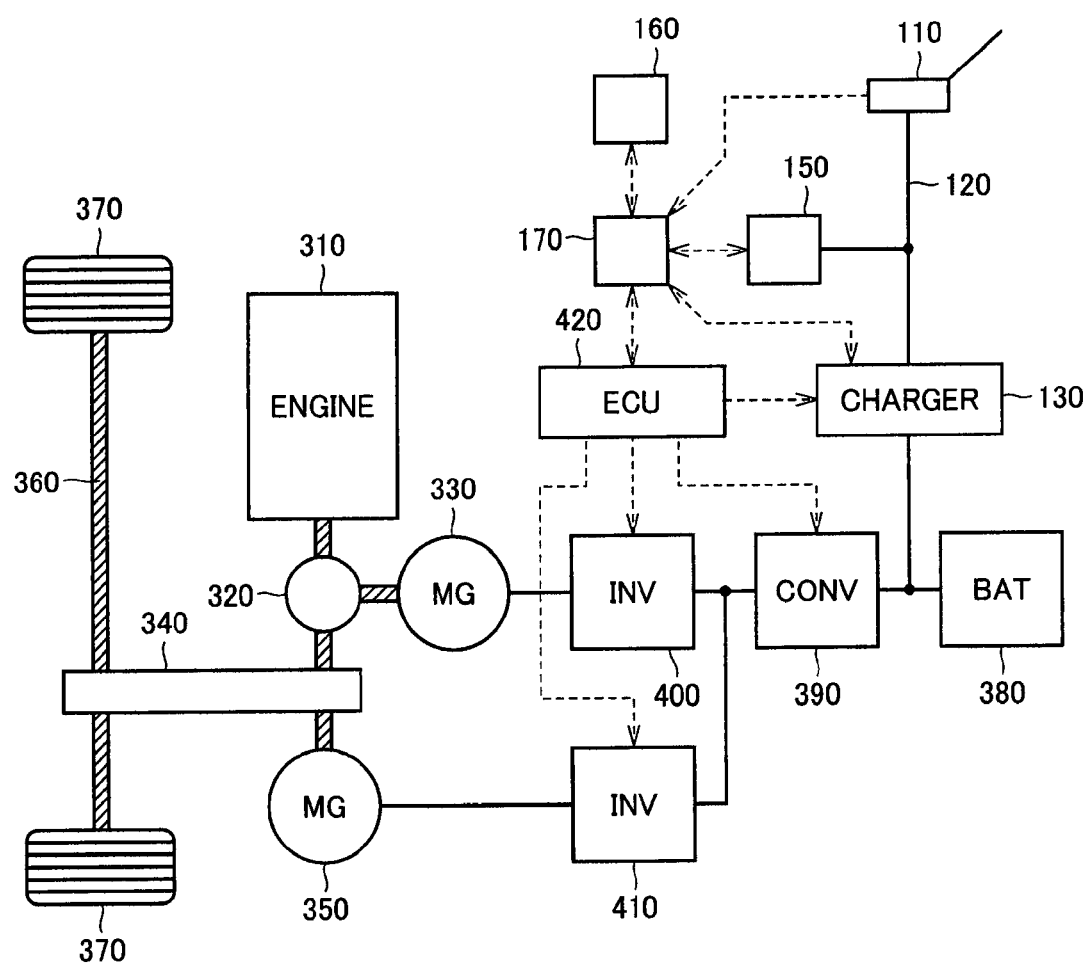
FIG. 2 is an overall block diagram of a vehicle shown in FIG. 1.

Referring to FIG. 2, a further description of vehicle 10 will be given. It is noted that vehicle 10 is not limited to one that has a configuration as described below and may be implemented by an electric vehicle or a fuel cell vehicle instead of the hybrid vehicle shown in FIG. 2.

Vehicle 10 includes an engine 310, a motive power split device 320, motor generators 330, 350, a speed reducer 340, a drive shaft 360, and drive wheels 370. Vehicle 10 further includes a power storage device 380, a boost converter 390, inverters 400, 410, and an ECU (Electronic Control Unit) 420. Vehicle 10 still further includes, as shown in FIG. 1, charging port 110, power line 120, charger 130, PLC processing device 150, wireless communication device 160, and communication control device 170.

Engine 310 and motor generators 330, 350 are linked to motive power split device 320. Vehicle 10 travels powered by driving force from at least one of engine 310 and motor generator 350. Motive power split device 320 splits the motive power generated by engine 310 between two paths, i.e. one path for transmission via speed reducer 340 to drive shaft 360 and the other path for transmission to motor generator 330.

Motor generator 330 is an AC rotating electric machine, for example, a three-phase AC synchronous electric machine. Motor generator 330 generates electricity using motive power of engine 310 which has been split by motive power split device 320. For example, when the state of charge (also called as "SOC") of power storage device 380 becomes lower than a predetermined value, engine 310 starts up so that motor generator 330 generates electricity. The electric power generated by motor generator 330 is then converted from AC to DC by inverter 400 and stepped down by boost converter 390 and then stored in power storage device 380.

Motor generator 350 is an AC rotating electric machine, for example, a three-phase AC synchronous electric machine. Motor generator 350 generates driving force for the vehicle using at least one of electric power stored in power storage device 380 and electric power generated by motor generator 330. Driving force of motor generator 350 is then transmitted via speed reducer 340 to drive shaft 360.

It is noted that during the braking of the vehicle, motor generator 350 is driven using kinetic energy of the vehicle, and motor generator 350 operates as an electric generator. This causes motor generator 350 to operate as a regenerative brake which converts braking energy into electric power. The electric power generated by motor generator 350 is then stored in power storage device 380.

Motive power split device 320 is formed of a planetary gear including a sun gear, a pinion gear, a carrier, and a ring gear. The pinion gear engages with the sun gear and the ring gear. The carrier supports the pinion gear in a rotatable manner and is linked to a crankshaft of engine 310. The sun gear is linked to a rotation shaft of motor generator 330. The ring gear is linked to a rotation shaft of motor generator 350 and speed reducer 340.

Power storage device 380 is a rechargeable DC power supply and formed of, for example, a secondary battery such as a nickel-metal hydride battery or a lithium-ion battery. Power storage device 380 stores not only electric power generated by motor generators 330, 350 but also electric power supplied from the power supply external to the vehicle (system power supply in FIG. 1) via power line 120 during external charging. It is noted that power storage device 380 may be implemented by a capacitor having a large capacity.

Based on a control signal from ECU 420, boost converter 390 regulates a DC voltage applied to inverters 400, 410 to be not less than the voltage of power storage device 380. Boost converter 390 is configured of a boost chopper circuit, for example.

Based on a control signal from ECU 420, inverter 400 converts electric power generated by motor generator 330 into DC power and outputs the DC power to boost converter 390. Based on a control signal from ECU 420, inverter 410 converts electric power supplied from boost converter 390 into AC power and outputs the AC power to motor generator 350. It is noted that during start-up of engine 310, inverter 400 converts electric power supplied from boost converter 390 into AC power and outputs the AC power to motor generator 330. During the braking of the vehicle, inverter 410 converts electric power generated by motor generator 350 into DC power and outputs the DC power to boost converter 390.

ECU 420 generates a control signal for driving boost converter 390 and motor generators 330, 350 and outputs the generated control signal to boost converter 390 and inverters 400, 410. During external charging, ECU 420 outputs a control signal for driving charger 130 and outputs the control signal to charger 130.

It is noted that charging port 110, power line 120, charger 130, PLC processing device 150, wireless communication device 160, and communication control device 170 have been described in FIG. 1, and therefore, the description thereof will not be repeated. Charger 130 is connected between power storage device 380 and boost converter 390.

It is noted that engine 310, motive power split device 320, motor generators 330, 350, speed reducer 340, drive shaft 360, drive wheels 370, power storage device 380, boost converter 390, inverters 400, 410, and ECU 420 make up motive power output device 140 shown in FIG. 1.

Figure 3:
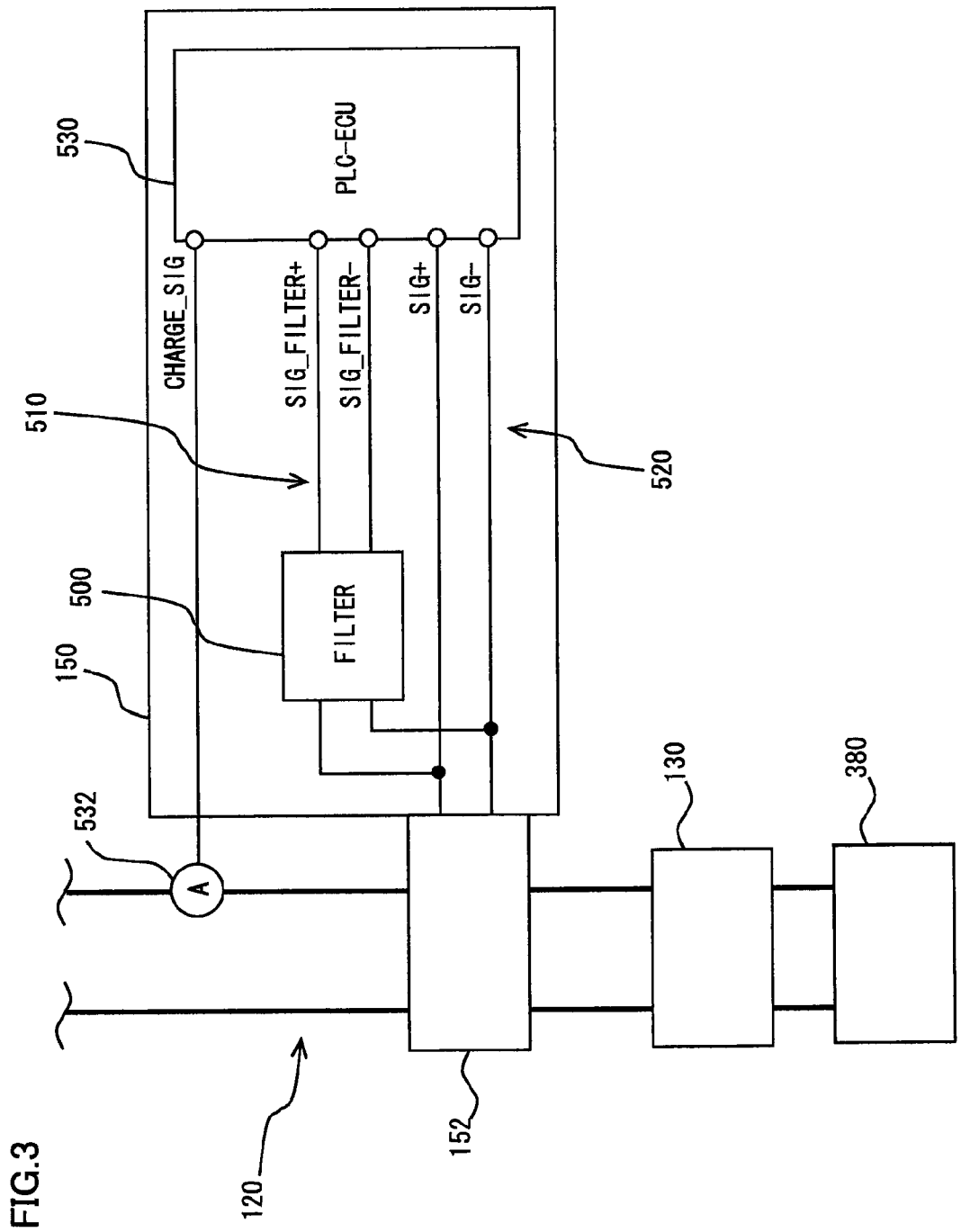
FIG. 3 is a block diagram of a PLC processing device shown in FIG. 1.

Referring to FIG. 3, a further description of PLC processing device 150 will be given. PLC processing device 150 is connected via a connector 152 to power line 120. PLC processing device 150 includes a filter 500, a first signal line 510, a second signal line 520, and a PLC-ECU 530.

Filter 500 removes noise from a signal which was transmitted using power line 120. That is, noise is removed from a signal which PLC processing device 150 has received. On first signal line 510, filter 500 is provided. In contrast, second signal line 520 bypasses filter 500. Filter 500 is implemented by a filter satisfying desired functions, such as a high-pass filter, a low-pass filter, and a band-pass filter. It is noted that a combination of a high-pass filter, a low-pass filter, and a band-pass filter may configure filter 500.

First signal line 510 passes through filter 500 and connects power line 120 and PLC-ECU 530 together. Therefore, a signal which has passed through filter 500 is transmitted from first signal line 510 to PLC-ECU 530.

Second signal line 520 bypasses filter 500 and connects power line 120 and ECU 530 together. Therefore, a signal which has bypassed (has not passed through) filter 500 is transmitted from second signal line 520 to PLC-ECU 530.

PLC-ECU 530 is connected to first signal line 510 and second signal line 520. PLC-ECU 530 controls communication by PLC processing device 150. In the embodiment, while power storage device 380 is being charged, PLC-ECU 530 communicates using a signal which has passed through filter 500. While the charging of power storage device 380 is stopped, PLC-ECU 530 communicates using a signal which has bypassed filter 500. More specifically, while power storage device 380 is being charged, PLC-ECU 530 communicates using first signal line 510. Therefore, first signal line 510 is used to receive and send a signal. While the charging of power storage device 380 is stopped, PLC-ECU 530 communicates using second signal line 520. Therefore, second signal line 520 is used to receive and send a signal.

It is noted that instead of connecting both first signal line 510 and second signal line 520 to PLC-ECU 530 at all times, a signal line to be connected to PLC-ECU 530 may be switched between first signal line 510 and second signal line 520 using a switching element such as a relay. A signal to be inputted to PLC-ECU 530 may also be switched between a signal transmitted from first signal line 510 and a signal transmitted from second signal line 520.

Whether or not power storage device 380 is being charged may be determined based on current detected by a current sensor 532, for example. When detected current is equal to or more than a threshold value, it is determined that power storage device 380 is being charged. When detected current is less than the threshold value, it is determined that the charging of power storage device 380 has been stopped. It is noted that a method of determining whether or not power storage device 380 is being charged is not limited to the above.

Referring to FIG. 4, a process executed by PLC processing device 150, more specifically, by PLC-ECU 530 will be described.

In step (hereinafter step will be abbreviated as S) 100, whether or not to perform communication by PLC processing device 150 is determined. That is, whether or not charging port 110 has charging cable 30 connected thereto is determined. If communication by PLC processing device 150 is to be performed (YES in S100), then the process shifts to S102. If not (NO in S100), then the process returns to S100.

In S102, whether or not power storage device 380 is being charged is determined. If power storage device 380 is being charged (YES in S102), then the process shifts to S104. If the charging of power storage device 380 has been stopped (NO in S102), then the process shifts to S106.

In S104, a signal which has passed through filter 500 is used for communication. That is, first signal line 510 is used for communication.

In S106, a signal which has bypassed filter 500 is used for communication. That is, second signal line 520 is used for communication.

In S108, whether or not the speed of communication is equal to or higher than predetermined speed of communication is determined. If the speed of communication is equal to or higher than the predetermined speed of communication (YES in S108), then the process shifts to S110. If the speed of communication is lower than the predetermined speed of communication (NO in S108), the process shifts to S104. It is noted that a method of detecting the speed of communication can employ a well known technology, and therefore, a detailed description thereof will not be repeated.

In S110, the use of a signal which has bypassed filter 500 for communication is continued. That is, the use of second signal line 520 for communication is continued.

A description will be given on an operation of PLC processing device 150 which is based on the configuration and flowchart as above.

When communication by PLC processing device 150 is to be performed (YES in S100), whether or not power storage device 380 is being charged is determined (S102). When power storage device 380 is being charged (YES in S102), a variety of noise superimposes on power line 120. Therefore, a signal transmitted for PLC-based communication could include much noise. For example, the signal could include noise generated at charger 130 during conversion from AC power to DC current and during boosting.

In this case, a signal which has passed through filter 500 is used for communication (S104). Communication can thereby be performed using a signal from which noise is removed. Consequently, although filter 500 causes a decrease in communication speed, the quality of communication can be enhanced.

Further, filter 500 for removing noise is provided on first signal line 510 which is distinct from power line 120. An occurrence of power loss due to filter 500 can thereby be avoided at all times.

In contrast, when the charging of power storage device 380 has been stopped (NO in S104), it is assumed that equipment connected to power line 120, such as charger 130, has stopped except PLC processing device 150. Therefore, there is little noise superimposing on power line 120. In this case, a signal which has bypassed filter 500 is used (S106). A decrease in communication speed due to filter 500 can thereby be suppressed.

However, when the speed of communication is lower than predetermined speed (NO in S108), it is assumed that a communication signal includes much noise for some reason. In this case, a signal which has passed through filter 500 is used for communication (S104).

When the speed of communication is equal to or higher than the predetermined speed (YES in S108), the use of a signal which has bypassed filter 500 for communication is continued (S110).

REFERENCE SIGNS LIST 10 vehicle; 20 house; 30 charging cable; 110 charging port; 120 power line; 130 charger; 140 motive power output device; 150, 220 PLC processing device; 152 connector; 160 wireless communication device; 170 communication control device; 210 power line; 230 wireless communication device; 240 data communication network; 250 server; 260 wireless communication device; 310 engine; 320 motive power split device; 330, 350 motor generator; 340 speed reducer; 360 drive shaft; 370 drive wheel; 380 power storage device; 390 boost converter; 400, 410 inverter; 420 ECU; 500 filter; 510 first signal line; 520 second signal line; 530 PLC-ECU; 532 current sensor.

The invention claimed is:

1. A vehicle supplied with electric power from an external power supply, comprising:
    a power storage device charged with electric power supplied from said power supply; and
    a communication device to communicate with a device external to said vehicle by utilizing, as a communication path, a power line to supply electric power from said power supply to said power storage device
    said communication device including:
        a first signal line provided with a filter for removing noise from a signal transmitted using said power line; and
        a second signal line bypassing said filter, and
    said communication device communicating using:
        a signal having passed through said filter while said power storage device is being charged; and
        a signal having bypassed said filter while the charging of said power storage device is stopped.

2. The vehicle according to claim 1, wherein
    said communication device further includes a communication control unit connected to said first signal line and said second signal line,
    said first signal line passes through said filter and connects said power line and said communication control unit together,
    said second signal line bypasses said filter and connects said power line and said communication control unit together, and
    said communication control unit communicates using:
        said first signal line while said power storage device is being charged; and
        said second signal line while the charging of said power storage device is stopped.

3. A communication device for a vehicle that is configured to charge electric power supplied from an external power supply into a power storage device and to communicate with an external device by utilizing, as a communication path, a power line for supplying electric power from said power supply to said power storage device, comprising:
    a first signal line provided with a filter for removing noise from a signal transmitted using said power line;
    a second signal line bypassing said filter; and
    a communication control unit for communicating using:
        a signal having passed through said filter while said power storage device is being charged; and
        a signal having bypassed said filter while the charging of said power storage device is stopped.

4. The communication device for a vehicle according to claim 3, wherein
    said communication control unit is connected to said first signal line and said second signal line,
    said first signal line passes through said filter and connects said power line and said communication control unit together,
    said second signal line bypasses said filter and connects said power line and said communication control unit together, and
    said communication control unit communicates using:
        said first signal line while said power storage device is being charged; and
        said second signal line while the charging of said power storage device is stopped.

* * * * *